United States Patent [19]
Wallack et al.

[11] Patent Number: 5,978,521
[45] Date of Patent: Nov. 2, 1999

[54] MACHINE VISION METHODS USING FEEDBACK TO DETERMINE CALIBRATION LOCATIONS OF MULTIPLE CAMERAS THAT IMAGE A COMMON OBJECT

[75] Inventors: Aaron S. Wallack, Natick; David J. Michael, Framingham, both of Mass.

[73] Assignee: Cognex Corporation, Natick, Mass.

[21] Appl. No.: 08/937,384

[22] Filed: Sep. 25, 1997

[51] Int. Cl.[6] .................................................. G06K 9/32
[52] U.S. Cl. ........................ 382/294; 382/287; 382/291; 382/295
[58] Field of Search ................................. 382/287, 291, 382/294, 295, 103, 130

[56] References Cited

U.S. PATENT DOCUMENTS

| | | |
|---|---|---|
| 5,027,419 | 6/1991 | Davis . |
| 5,179,419 | 1/1993 | Palmquist et al. . |
| 5,297,238 | 3/1994 | Wang et al. . |
| 5,329,469 | 7/1994 | Watanabe . |
| 5,471,312 | 11/1995 | Watanabe et al. . |
| 5,553,859 | 9/1996 | Kelly et al. . |
| 5,642,442 | 6/1997 | Morton et al. ........................... 382/287 |
| 5,742,699 | 4/1998 | Adkins et al. ........................... 382/103 |
| 5,872,870 | 2/1999 | Michael .................................. 382/291 |
| 5,878,165 | 3/1999 | Ono ......................................... 382/291 |

*Primary Examiner*—Amelia Au
*Assistant Examiner*—Gilberto Frederick, II
*Attorney, Agent, or Firm*—David J. Powsner; Russ Weinzimmer

[57] ABSTRACT

The invention provides improved machine vision methods for determining a calibration relationship among the imaging reference frames of multiple cameras (or other image acquisition devices) that acquire images of a common moveable object. The calibration relationship includes parameters for transforming positional coordinates among the camera's respective imaging reference frames. The method includes placing on the common object, stage, or belt a plurality of fiducials, e.g., calibration marks, that are at known positions relative to each other with respect to a frame of reference referred to as the "alignment reference frame"; aligning an axis of the alignment reference frame with an axis of the object's reference frame of motion, i.e., the reference frame in which the object, frame or belt moves; placing a respective fiducial in the field of view of each camera; determining a calibration relationship among the imaging reference frames of the respective image acquisition devices as a function of (i) the known relative locations of the fiducials (vis-à-vis the alignment reference frame), (ii) the fiducial calibrating positions determined for each camera (vis-à-vis that camera's acquisition reference frame), and (iii) the object calibrating positions determined for each respective image acquisition device (vis-à-vis the motion reference frame).

29 Claims, 8 Drawing Sheets

MACHINE VISION METHODS USING FEEDBACK TO DETERMINE CALIBRATION LOCATIONS OF MULTIPLE CAMERAS THAT IMAGE A COMMON OBJECT

RESERVATION OF COPYRIGHT

The disclosure of this patent document contains material that is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention pertains to machine vision and, more particularly, to methods for calibrating the imaging reference frame of a camera (or other image acquisition device) to that of a moveable object imaged by the camera.

Machine vision is the automated analysis of images to determine characteristics of objects shown in them. It is often employed in automated manufacturing lines, where images of components are analyzed to determine placement and alignment during assembly. Machine vision is also used for quality assurance. For example, in the semiconductor device industry, images of chips are analyzed to insure that leads, solder paste and other components do not overrun designated boundaries.

In many machine vision applications, it is essential to correlate physical coordinates in the "real world" with pixel coordinates in an image. For example, a camera image of a circuit board being assembled on a motion stage—a motorized platform that can be positioned by rotation and by movement along the x- and y-axes—may reveal that a chip or other component is misplaced by several pixels. In order to properly reposition the stage, the precise relationship between coordinates in the image and those of the stage must be known.

That relationship is known as the calibration relationship. It includes the angular orientation of the reference frame of the image vis-à-vis the reference frame of motion of the stage; the ratio of a unit of height (i.e., pixel height) in the image reference frame to a unit of motion along the y-axis of the stage; the ratio of a unit of width (i.e., pixel width) in the image reference frame to a unit of motion along the x-axis of the stage; and the location of a point in the image reference frame (e.g., the center of the camera field of view) vis-à-vis a point in the motion reference frame (e.g., the center of rotation of the stage).

The prior art suggests the use of calibration plates to determine the relationship between the imaging and motion reference frames. The surfaces of these plates are typically machined or etched with precisely spaced markings such as checkerboards, "bulls-eyes," or other such patterns. When camera images of the plate and stage are analyzed, the known spacings between markings on the plate are compared with those that appear in the images, thus, enabling calculation of the calibration relationship.

It is important to fabricate calibration plates carefully, because any imperfections in the marking pattern can lead to inaccurate calibrations. Unfortunately, even a precisely machined calibration plate may not be sufficiently accurate for use in calibrating highly magnified images. Small deviations falling well within tight machine tolerances may adversely affect the calibration relationship. This problem is further exacerbated in machine vision systems that use multiple cameras to image a single object. Such systems are used, for example, in semiconductor chip manufacture, where two or more high-resolution cameras are used to simultaneously inspect multiple regions on the chip surface. In addition to the difficulties associated with calibrating the reference frame of a single camera to the real world reference frame of the chip surface (or motion stage) are those associated with calibrating the reference frames of the cameras to one another.

An object of this invention is to provide improved machine vision systems and, particularly, improved machine visions methods and apparatus for calibrating the imaging reference frames to multiple cameras that generate images of a common object.

Another object of the invention is to provide machine vision methods and apparatus for calibrating the imaging reference frames to multiple cameras that generate images of objects on a common motion stage or conveyor, or that otherwise move with one another.

A still more particular object of the invention is to provide such methods and apparatus as are capable of providing accurate calibrations without the use of expensive calibration plates.

Yet another object of the invention is to provide such methods and apparatus as can be implemented on conventional digital data processors or other conventional machine vision analysis equipment.

Yet still another object of the invention is to provide such methods and apparatus that can rapidly determine calibration relationships quickly and without undue consumption of resources.

SUMMARY OF THE INVENTION

The foregoing are among those objects attained by the invention, one aspect of which provides improved machine vision methods for determining a calibration relationship between the imaging reference frames of multiple cameras (or other image acquisition devices) that acquire images of a common moveable object.

This aspect of the invention can be used, for example, to determine calibration relationships between multiple cameras that inspect different regions of a semiconductor wafer, a printed circuit board or other object disposed on a motion stage or conveyor belt. It can also be used, by way of further example, to determine calibration relationships between multiple cameras that inspect different objects on such a stage or belt.

The calibration relationship contemplated by this aspect of the invention includes parameters for transforming positional coordinates between the camera's respective imaging reference frames. Thus, for example, this aspect of the invention can be used to answer the question "if one end of a feature appears at coordinates $(x_0, y_0)$ in the field of view of the first camera and the other end appears at coordinates $(x_1, y_1)$ in the field of view of a second camera, how long is the object?"

A method according to this aspect of the invention includes the step of placing on the common object, stage, or belt a plurality of fiducials, e.g., calibration marks, that are at known positions relative to each other with respect to a frame of reference referred to as the "alignment reference frame." Preferably, at least one of the fiducials has an edge, cross, or other feature that is aligned with the alignment reference frame. The fiducials can be affixed to a plate (e.g., a calibration plate) that itself is placed on the object, stage or belt, in lieu of the individual fiducials.

The method according to this aspect of the invention further includes aligning an axis of the alignment reference frame with an axis of the object's reference frame of motion, i.e., the reference frame in which the object, frame or belt moves. Thus, for example, if the alignment reference frame is defined by an edge on one of the fiducials, this step can include rotating the object (and, therefore, the fiducial) until that edge lines up with the x-axis (or y-axis) of motion of the object.

Once the alignment and motion reference frames are aligned, the method calls for placing a respective fiducial in the field of view of each camera. The position of the fiducial (i.e., "fiducial calibrating position") with respect to each camera's imaging reference frame is determined, e.g., by analysis of an image generated by the camera. The corresponding position of the object with respect to the motion reference frame (i.e., the "object calibrating position") is also determined, e.g., via rulers, calipers or, for objects disposed on a motion stage, via read-outs on the stage's x-axis and y-axis motors.

The method does not require that the fiducial and object calibrating positions be acquired for each camera simultaneously. Thus, a first fiducial can be moved into the field of view of a first camera for purposes of determining its fiducial and object calibrating positions; a second fiducial can be moved into the field of view of a second camera for purposes of determining its fiducial and object calibrating positions; and so forth.

A method according to this aspect of the invention calls for determining a calibration relationship between the imaging reference frames of the respective image acquisition devices as a function of (i) the known relative locations of the fiducials (vis-à-vis the alignment reference frame), (ii) the fiducial calibrating positions determined for each camera (vis-à-vis that camera's acquisition reference frame), and (iii) the object calibrating positions determined for each respective image acquisition device (vis-à-vis the motion reference frame).

More particularly, according to a related aspect of the invention, the calibration relationship is determined in accord with the expression:

$$\begin{vmatrix} O_{2x} - O_{1x} \\ O_{2y} - O_{1y} \end{vmatrix} = \begin{vmatrix} F_{2x} \\ F_{2y} \end{vmatrix} - \begin{vmatrix} F_{1x} \\ F_{1y} \end{vmatrix} -$$

$$\begin{vmatrix} w_2\cos(\tau_2) & -h_2\sin(\tau_2) \\ w_2\sin(\tau_2) & h_2\cos(\tau_2) \end{vmatrix} \begin{vmatrix} I_{2x} \\ I_{2y} \end{vmatrix} + \begin{vmatrix} w_1\cos(\tau_1) & -h_1\sin(\tau_1) \\ w_1\sin(\tau_1) & h_1\cos(\tau_1) \end{vmatrix} \begin{vmatrix} I_{1x} \\ I_{1y} \end{vmatrix}$$

where, $O_{ix}$, $O_{iy}$ is a location, in the motion reference frame, corresponding to an upper lefthand corner of a field of view of camera i;

$F_{ix}$, $F_{iy}$ represent the known relative locations of the fiducial i vis-à-vis the alignment reference frame.

$w_i$ is the unit height of the field of view of camera i vis-à-vis the motion reference frame;

$h_i$ is the unit height of the imaging reference frame of camera i vis-à-vis the motion reference frame;

$\tau$ is the orientation of the imaging reference frame of camera i vis-à-vis the motion reference frame; and $I_{ix}$, $I_{iy}$ represent the position of fiducial i with respect to the corresponding imaging reference frame.

Further aspects of the invention provide methods for aligning a selected fiducial with the motion reference frame.

One such method calls for placing the selected fiducial in a field of view of a camera and determining the fiducial's location (the "first fiducial position") with respect to the imaging reference frame of that camera. The object is then moved along an axis of the motion reference frame and, again, placed in (or retained in) the field of view of the camera. Again, the fiducial's location (the "second fiducial position") is determined with respect to the imaging reference frame of the camera. The orientation of the motion reference frame with respect to the imaging reference frame is determined as a function of the first and second fiducial positions, e.g., by finding the line defined by those positions. The object is then rotated to bring the fiducial—and, more specifically, for example, an alignment feature thereon (such as an edge or other linear feature)—in substantial alignment with the motion reference frame.

A related aspect of the invention provides another such method for aligning with the motion reference frame a fiducial that has a linear feature (e.g., a line or edge). According to this aspect of the invention, the method calls for placing the fiducial in a field of view of a selected image acquisition device and determining the parameters of a line describing the linear feature (the "first linear parameters") with respect to the imaging reference frame. The method then calls for moving the object with respect to the motion reference frame. Once again, the fiducial's linear parameters are determined vis-à-vis the imaging reference frame of the camera (the "second linear parameters"). By comparing the first and second linear parameters, the method determines whether the linear feature—and, therefore, the alignment reference frame—is in substantial alignment with the motion reference frame. More particularly, the method deems the two reference frames as being aligned when the first and second linear parameters describe lines with substantially the same x- and/or y-axis intercepts vis-à-vis the imaging reference frame. If those intercepts are not substantially the same, the method calls for rotating the object and repeating the foregoing steps.

In still other aspects, the invention provides apparatus operating in accord with the methodology above for determining the aforementioned calibration relationships.

In yet still other aspects, the invention provides articles of manufacture embodying a computer program for causing a digital data processing apparatus to determine calibration relationships in accord with the methods above.

These and other aspects of the invention are evident in the drawings and in the description that follows.

The invention has wide application in industry and research applications. It facilitates the calibration of machine vision image acquisition equipment (e.g., cameras) in order to improve the speed and accuracy of analysis of objects under inspection. Thus, for example, a multi-camera machine vision system calibrated in accord with the invention can be used to automatically control movement of an assembly line motion stage without reliance on expensive, and possibly flawed, calibration plates.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
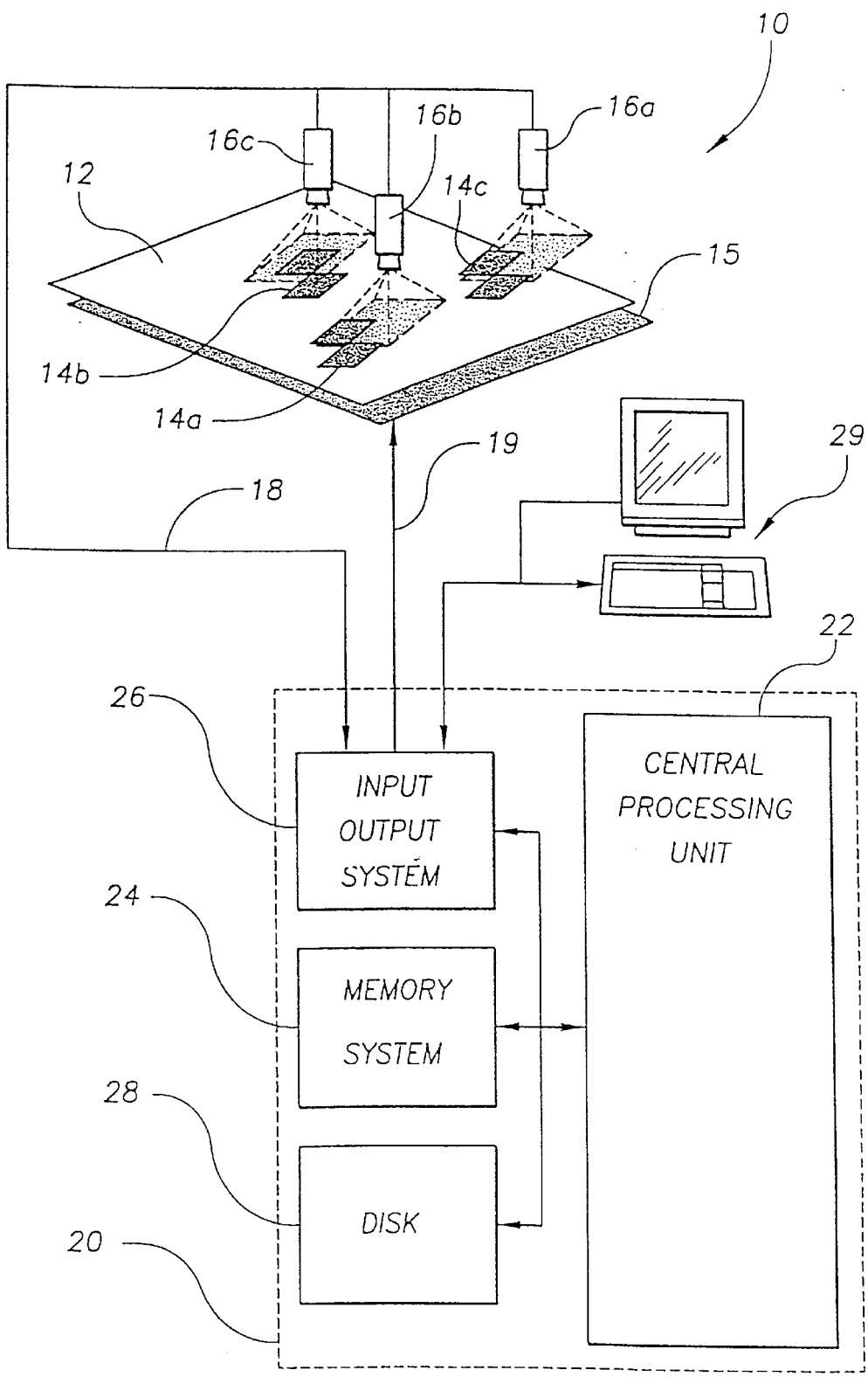
FIG. 1 depicts a machine vision system for practice of the invention.

FIG. 1 depicts a machine vision system 10 according to the invention for determining a calibration relationship between the imaging reference frames of multiple image acquisition devices that generate images of a common moveable object 12 (e.g., a printed circuit board under assembly).

The illustrated system 10 includes image acquisition devices 16a, 16b, 16c, that generate images of respective (albeit, possibly overlapping) regions of object 12. The devices 16a–16c may be video cameras, charge coupled display (CCD) devices, or any other device suitable for imaging at least fiducials 14a–14c disposed on object 12. Digital image data (or pixels) generated by the capturing devices 16a–16c represent, in the conventional manner, the image intensity (e.g., contrast, color, brightness) of each point in the field of view of the respective capturing device.

In the illustration, the object 12 is disposed on a conventional motion stage 15 of the type commercially available in the industry and capable of translating and rotating the object 12. Motion stage 15 has an actuator with a rotator mounted on a translating base such that the stage's center of rotation translates with the base. The term center of rotation refers to the (x,y) location of the physical point which remains stationary when the motion stage rotates. A preferred motion stage 15 has three degrees of freedom. Those skilled in the art will appreciate that the object 12 need not be disposed on a motion stage but, rather, can be disposed on a conveyor belt or other such conveyance device or it can be self-propelled. Those skilled in the art will also appreciate that the object 12 and the motion stage (or conveyor) 15 can be one in the same, i.e., that the invention can be applied to determining the calibration relationships between multiple objects on a common stage or conveyor 15.

Digital image data is transmitted from each acquisition device 16a–16c via separate communications paths, all shown here as communication path 18, to an image analysis system 20. This can be a conventional digital data processor, or a vision processing system of the type commercially available from the assignee hereof Cognex Corporation, as programmed in accord with the teachings hereof to determine the calibration relationship between the imaging reference frames of acquisition devices 16a–16c. The image analysis system 20 may have one or more central processing units 22, main memory 24, input-output system 26, and disk drive (or other mass storage device) 28, monitor and keyboard (or other user interface devices) 29, all of the conventional type. The image analysis system 20 can control movement of the object via communications path 19. More particularly, the illustrated system 20 transmits signals for controlling translation and rotation of the motion stage 15 and, in turn, controls the position of object 12 on stage 15.

The system 20 and, more particularly, central processing unit 22, is configured by programming instructions according to teachings hereof for operation as further described and illustrated herein. Those skilled in the art will appreciate that, in addition to implementation on a programmable digital data processor, the methods taught herein can be implemented in special purpose hardware.

Figure 2:
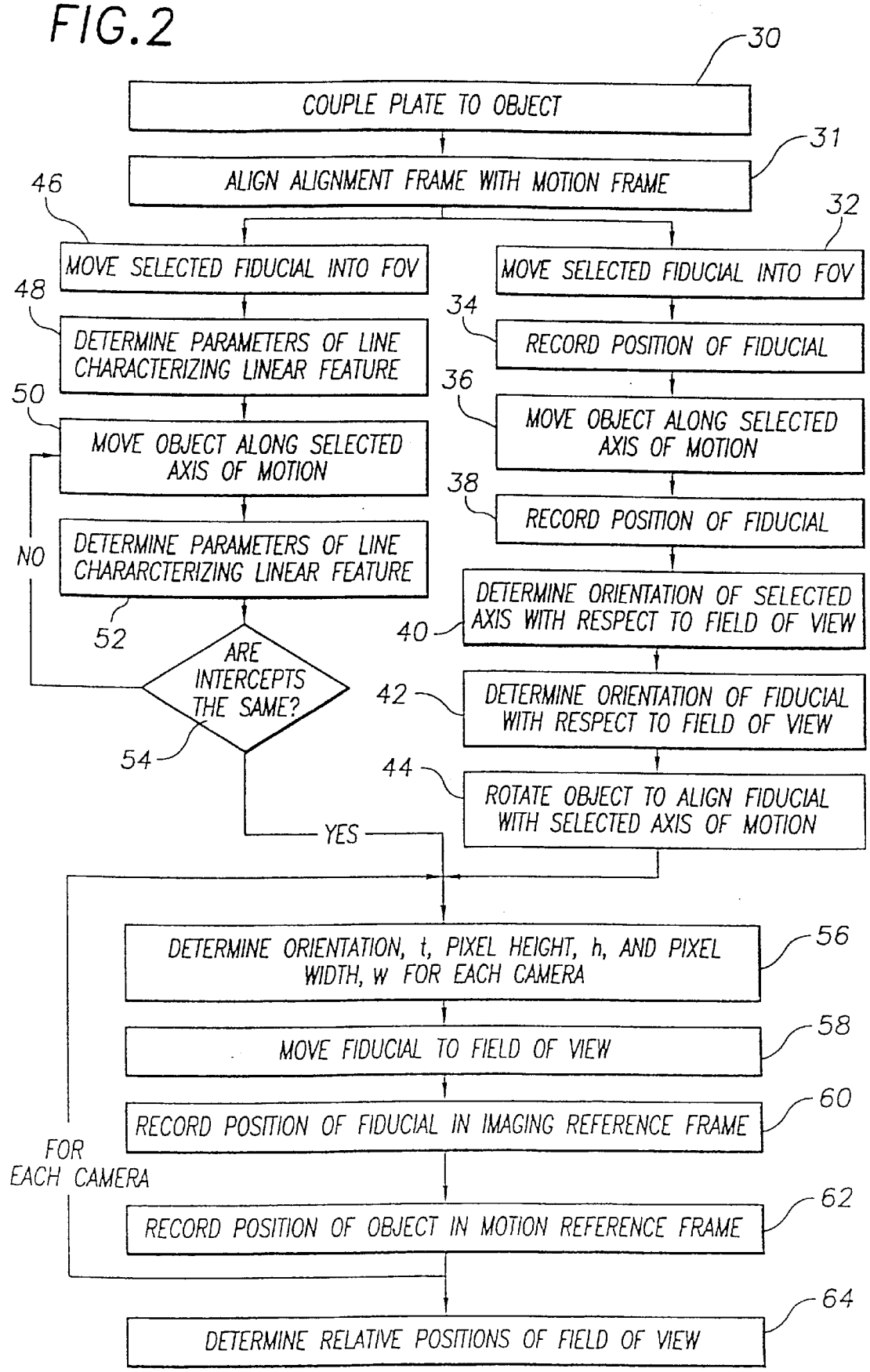
FIG. 2 depicts a method according to the invention for determining a calibration relationship between the imaging reference frames of multiple image acquisition devices that generate images of a common moveable object.

FIG. 2 depicts a method for determining a calibration relationship between the fields of view—and, more particularly, the imaging reference frames—of image acquisition device 16a–16c. More specifically, the drawing depicts a method according to the invention for determining parameters and/or a transformation matrix for mapping coordinates in the image reference frame of one of the devices, e.g., 16a, to coordinates in the image reference frame of the other devices, e.g., 16b, 16c.

The method includes a step 30 of coupling multiple fiducials 14a–14c to the object. Insofar as the positions of the fiducials 14a–14c relative to the object 12 are not critical to the invention, the fiducials 14a–14c can be placed on the object 12 at any location—so long as the fiducials so placed can be moved within the field of view of respective image acquisition devices 16a–16c, e.g., by motion stage 15.

Fiducials 14a–14c can be coupled to object 12 independently of one another. Preferably, however, they comprise a single unit (e.g., a calibration plate) in which they are rigidly affixed to one another at known relative positions. For example, the fiducials 14a–14c can be affixed to a rigid metal plate equidistant from one another at points corresponding to vertices of an equilateral triangle. In embodiments where four fiducials are used, they can be placed at points corresponding to vertices of a square. Of course, the invention contemplates the use of any number of fiducials, from two on up, which need not be placed in a regular pattern, so long as their relative positions are known.

The relative positioning of fiducials 14a–14c is known with respect to an alignment reference frame associated with the fiducials themselves, not necessarily with respect to the motion reference frame of the object 12 (at least initially) nor the imaging reference frames of the acquisition devices 16a–16c. Indeed, one step of the illustrated method is to rotate the object (and the fiducials thereon) to bring the alignment reference frame into alignment with the motion reference frame.

At least one of the fiducials (and preferably all of them) has an alignment feature, such as an linear edge, a line segment, or other such feature that is imageable by the acquisition devices 16a–16c and that is discernable by conventional machine vision tools (such as edge detectors) as having an definitive angular orientation. Preferably, that alignment feature is substantially aligned with at least a selected axis of the alignment reference frame, i.e., the coordinate system in which the relative positions of the fiducials is defined. Thus, for example, fiducials of the type shown in FIG. 3A can be affixed to a calibration plate such that the linear boundary between two selected regions is aligned with the x-axis of a coordinate system in which the relative spacing and angular positioning of the fiducials 14a–14c is measured. As an alternative to an alignment feature on the fiducials themselves, those skilled in the art will appreciate that two or more fiducials can be positioned relative to one another to define an alignment reference frame.

Figure 3A:
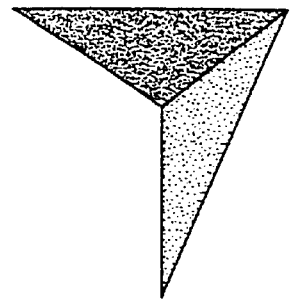
FIGS. 3A–3C depict magnitude invariant fiducials of the type used in a preferred practice of the invention.
Figure 3B:
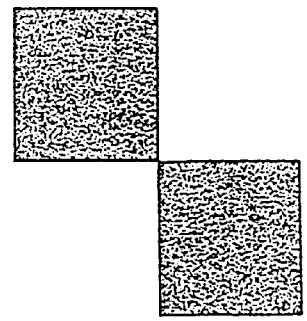
Figure 3C:
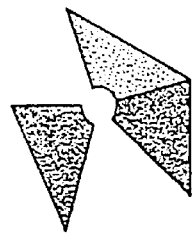

Each fiducial 14a–14c can be any conventional calibration target (e.g., an array of dots, a checkerboard, a bulls-eye of concentric circles, or a set of parallel stripes) though, more preferably, it is a magnification invariant target of the type shown in FIGS. 3A–3C and disclosed in co-pending, commonly assigned U.S. patent application Ser. No. 08/726, 521, filed Oct. 7, 1996 (Attorney Docket: 0150448-0036). As discussed in further detail in that co-pending, commonly assigned application (the teachings of which are incorporated herein by reference), a preferred calibration target has two or more regions, each having a different "imageable characteristic" (e.g., a different color, contrast, or brightness) from its neighboring region(s). Each region has at least two edges—referred to as "adjoining edges"—that are linear and that are directed toward and, optionally meet at, a reference point (e.g., the center of the target or some other location of interest).

Determination of the location and orientation in an image of each fiducial 14a–14c may be accomplished in any conventional manner known in the art. For fiducials of the type shown in FIGS. 3A–3C and described in the aforementioned U.S. patent application Ser. No. 08/726,521, location and orientation determinations are preferably accomplished via the techniques disclosed, e.g., in FIG. 4 of that application and in the accompanying text thereof.

The fiducials 14a–14c can be molded onto, etched into, printed on, or otherwise coupled to the object. In instances where the object 12 resides on a motion stage 15, the fiducials 14a–14c are typically placed on a calibration plate or calibration frame (not shown), which, in turn, is placed on the motion stage. Although the calibration plate can be bolted, fit or otherwise coupled to the motion stage, preferably, it is placed on the stage 15 and held in place by a vacuum (though, it can simply be held on by friction).

With continued reference to FIG. 2, in step 31 the method calls for aligning the alignment reference frame with the motion reference frame and, more particularly, for aligning an axis of the alignment reference frame with an axis of the motion reference frame.

Figure 7:
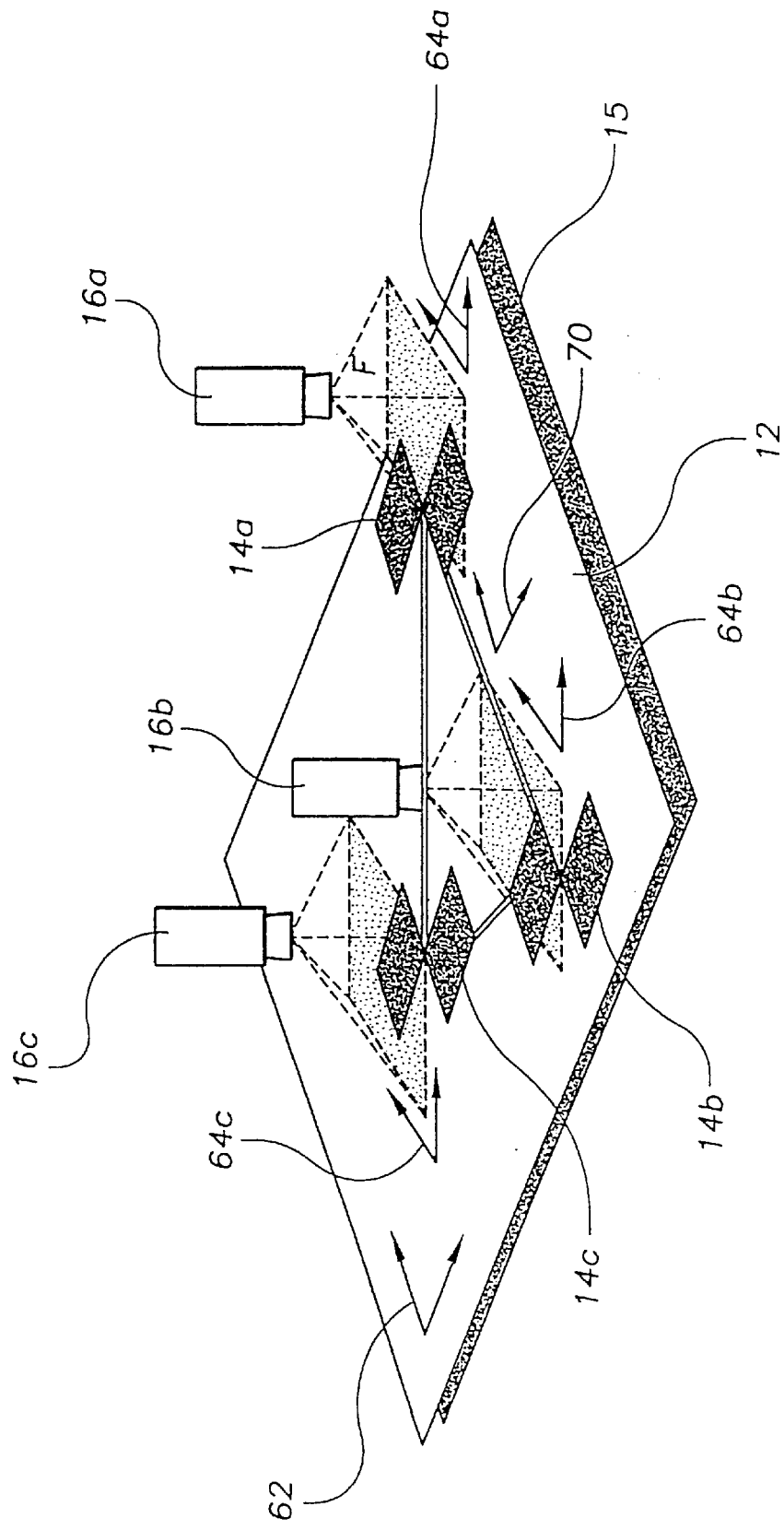
FIG. 7 depicts a relationship between the motion reference frame of an object, the imaging reference frames of image acquisition devices and an alignment reference frame.

To better illustrate the purpose of this step, FIG. 7 depicts a relationship among the motion reference frame, the imaging reference frames and the alignment reference frame. The illustrated relationship is an initial one, i.e., one existing prior to operation of step 31. In the drawing, object 12 is again shown as being disposed on motion stage 15, with cameras 16a–16c aimed for imaging potions of the object 12. The respective fields of view of each camera are shown as lightly shaded areas. Fiducials 14a–14c, which are rigidly connected to one another by a triangular frame member (not shown) to form a calibration plate, are disposed on the surface of object 12.

The orientation of the motion reference frame, which in the illustrated embodiment is defined by the motions effected by the actuators (not shown) of motion stage 15, is depicted by axes 62. The imaging reference frames of cameras 16a–16c, i.e., the orientations of their respective fields of view or resultant images, are depicted by axes 64a–64c, respectively. The alignment reference frame, which is aligned with principal axes of the fiducials 14a–14c, is depicted by axes 70. The goal of step 31 is to bring the alignment reference frame into alignment with the motion reference frame, i.e., to bring at least an axis of axes 70 into alignment with an axis of axes 62.

Steps 32–44 illustrates one method of aligning the alignment and motion reference frames 70, 62, respectively. In step 32, the object 12 and optional motion stage 15 are moved as necessary to bring at least a selected fiducial, e.g., fiducial 14a, into the field of view of a selected image acquisition device 16a at a location referred to herein as the first fiducial position. Though the first fiducial position can lie anywhere in the field of view of device 16, in a preferred embodiment, it lies at the center of the field of view.

Step 32 can be used to bring all fiducials 14a–14c into fields of view of their respective acquisition devices 16a–16c, though not necessarily simultaneously (depending on the relative spacing of the fiducials 14a–14c and of the fields of view). Rather, since all of the fiducials 14a–14c are generally fabricated in alignment with the alignment reference frame 70, steps 32–44 typically need to be applied to only one of the fiducials. Other embodiments could apply steps 32–44 to all fiducials 14a–14c, averaging or otherwise combining their respective results.

Figure 8:
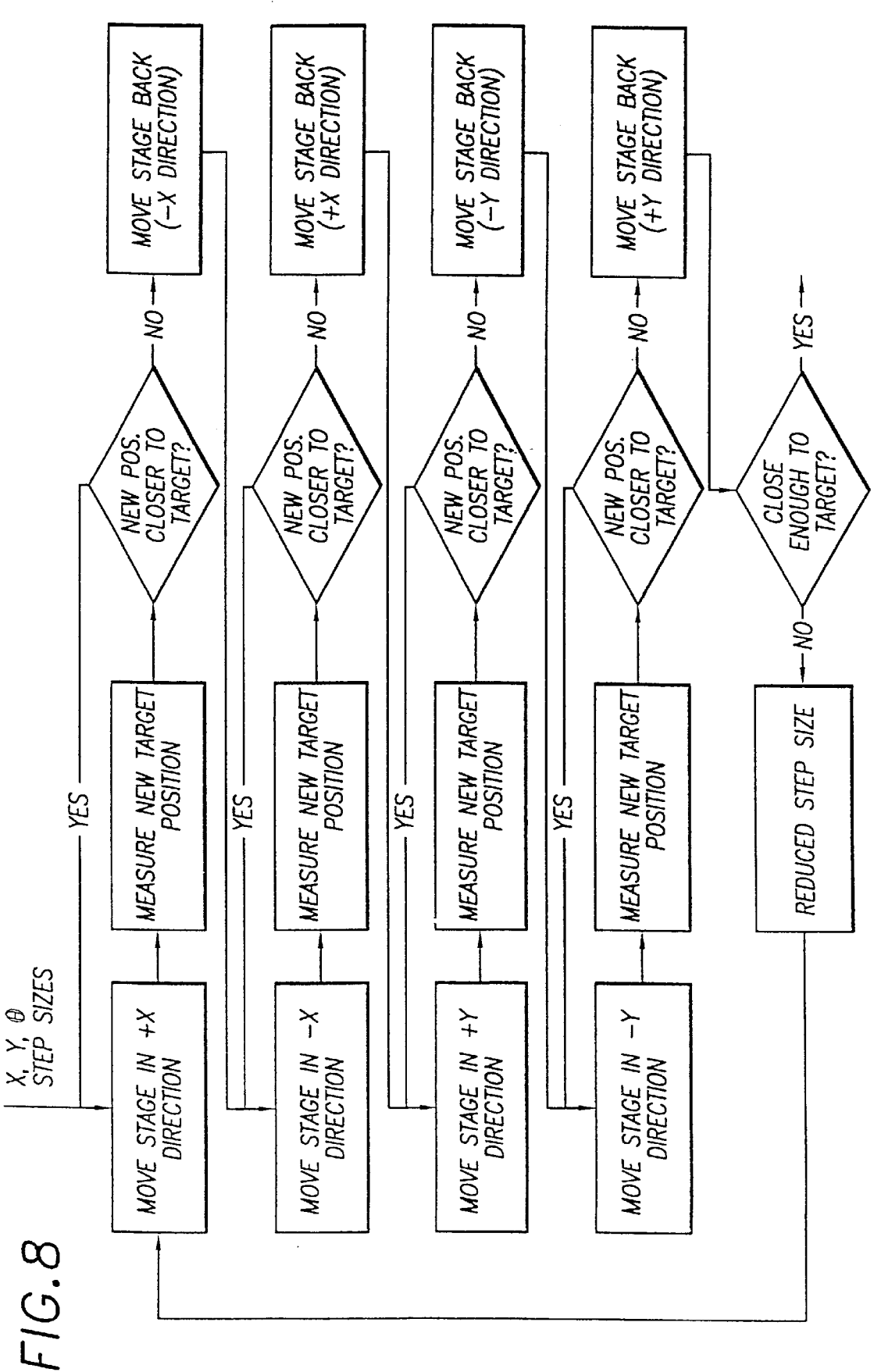
FIG. 8 depicts a technique according to the invention for positioning an object so that the fiducial falls at a specific location within the field of view of the camera.

Movement of the object 12 in step 32 can be accomplished in any manner known in the art though, preferably, it is accomplished using a technique illustrated in FIG. 8 to move the object 12 so that fiducial falls at a specific location within the FOV.

In step 34, the method calls for recording the first fiducial position that results from the movement effected in step 32. The first fiducial position—like the other positions and locations referred to throughout this disclosure—refers to a pair of coordinates, e.g., x-axis and y-axis coordinates (though, as noted below, such positions can be represented in r, θ or other such position-indicating coordinate sets). In the specific case of the first fiducial position, those coordinates are with respect to the imaging reference frame of acquisition device 16a, that is, in the coordinate system of images generated by that device 16. Axes of that reference frame are shown as 64a in the drawings. Although those coordinates can be in any units, preferably, they are in pixels.

In embodiments where step 32 involves moving the object 12 until the fiducial 14a falls anywhere in the field of view of device 16a, but not to a specific location therein, the pixel coordinates of the first fiducial position are determined in accord conventional techniques for locating a fiducial in an image. In a preferred embodiment, where step 32 utilizes a technique illustrated in FIG. 8 to move the object 12 so that fiducial falls at a specific location within the FOV, e.g., the center of the FOV, the coordinates of that specific location are deemed to be the first fiducial position.

In step 36, the method repositions the object 12 by moving it along an axis, e.g., the x-axis, of the motion reference frame. The distance moved is not critical, though, preferably object 12 is moved as much as possible while still keeping the selected fiducial 14a in the field of view of the selected acquisition device 16a.

In step 38, the resulting position of the fiducial 14a vis-à-vis the imaging reference frame of device 16a is determined, e.g., using conventional techniques or those shown in FIG. 8. That position, which is referred to as the "second fiducial position," is recorded as above.

In step 40, the method determines the orientation τ of the motion reference frame 62 with respect to the imaging reference frame 64a of acquisition device 16a as a function of the first and second fiducial positions. This is preferably accomplished by computing the orientation of a line 75 defined by those positions vis-à-vis the imaging reference frame 64a and, more preferably, as a function of the relation:

$$\tau = -a \tan 2(i_{y1} - i_{y0}, i_{x1} - i_{x0})$$

where, ($i_{x0}$, $i_{y0}$) are imaging reference frame coordinates of the first fiducial position; ($i_{x1}$, $x_{y1}$) are imaging reference frame coordinates of the second image position; a tan 2() is an arctangent function.

Figure 4A:
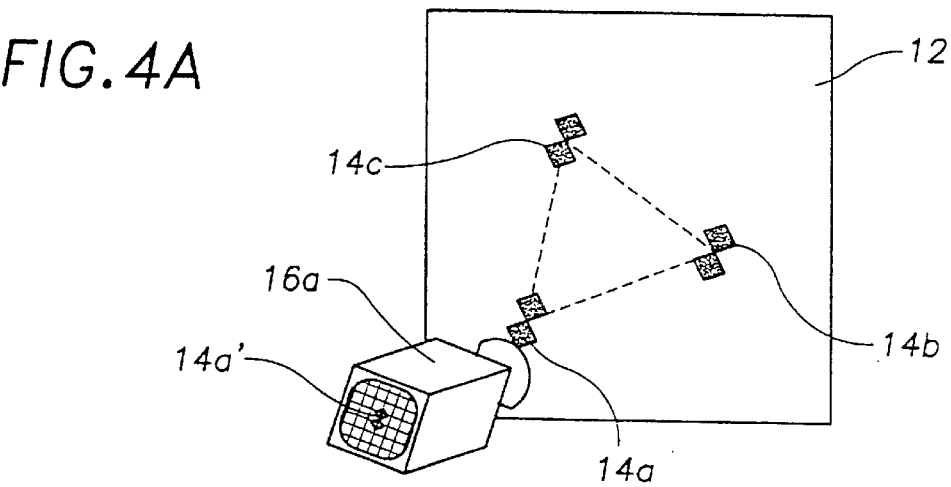
FIGS. 4A–4C depict the positioning and repositioning of an object and its fiducial during practice of the invention.
Figure 4B:
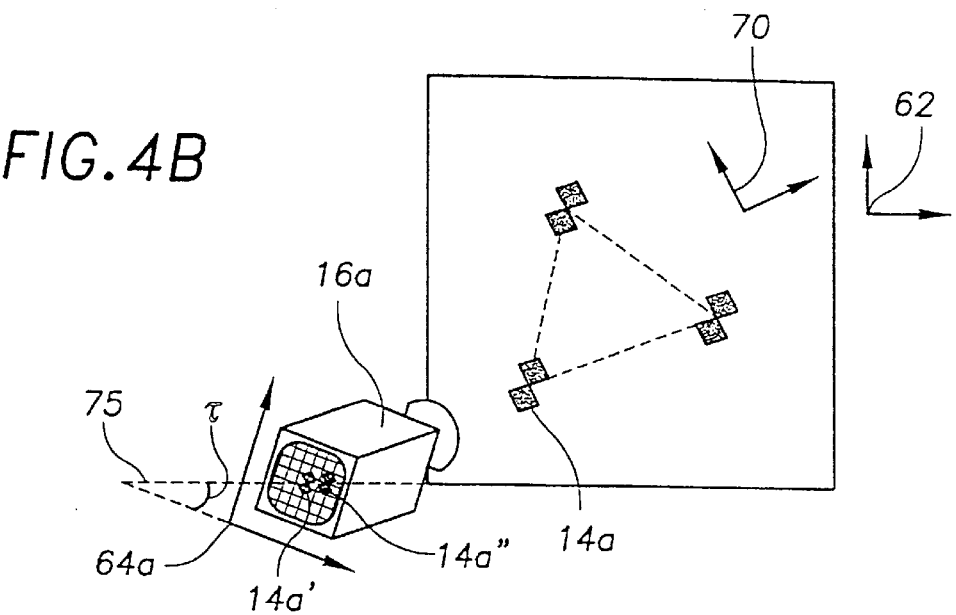
Figure 4C:
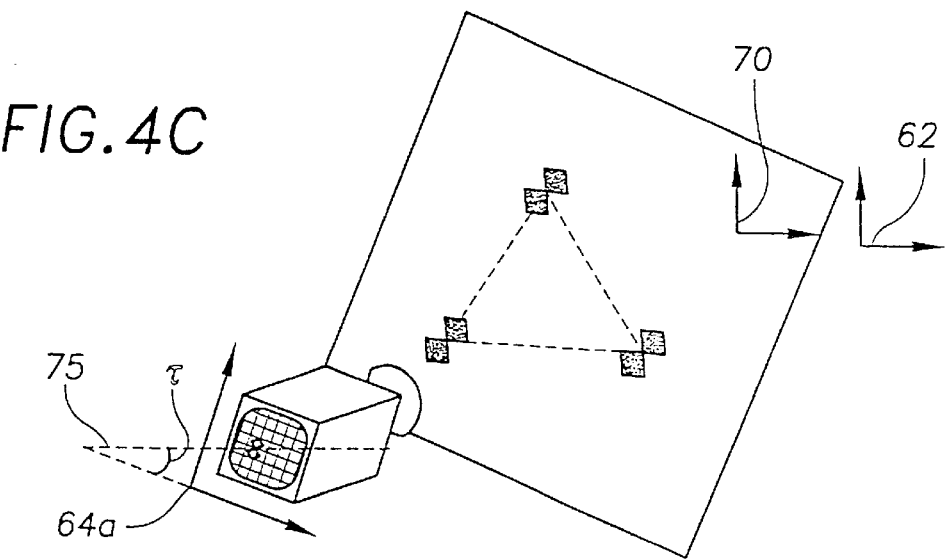

This is best illustrated in FIGS. 4A–4C, which show the positioning of object 12, fiducial 14a and its respective images in the field of view of acquisition devices 16a during the foregoing steps.

Referring to FIG. 4A, object 12 is shown as having been positioned (e.g., via movement of a motion stage 15) per step 32 such that the image 14a' of fiducial 14a lies at the first fiducial position, i.e., in the center of the field of view of image acquisition device 16a. For simplicity of illustration, that field of view is graphically depicted as an image on the back surface of device 16a. In preferred embodiments, such an image is optionally presented on a separate monitor 29 attached to the system 10. Still more preferably, the image is electronically transmitted to the image analysis system 20 for determination of fiducial position.

Referring to FIG. 4B, object 12 is shown as having been moved per step 36 along the x-axis of the motion reference frame 62, e.g., via actuation of the x-axis motor of motion stage 15. The resulting movement of fiducial 14a is shown by device 16a as fiducial image 14a", which lies at the second fiducial position. The first fiducial position is shown as "ghost" or grayed image 14a'.

In step 42, the illustrated method determines the orientation, $i_\theta$, of the selected fiducial 14a (and, more particularly, its images 14a' and/or 14a")—and, thereby, the orientation of the alignment frame 70—vis-à-vis the imaging reference frame 64a. This can be accomplished using conventional techniques known in the art and, particularly, depends on the type of fiducial 14a. For a fiducial with a predominant linear feature that defines the its orientation, step 42 can use edge detection, or another such prior art technique, to determine the orientation. For fiducials of the type shown in FIGS. 3A–3C, orientation is preferably determined in accord with the teachings of aforementioned U.S. patent application Ser. No. 08/726,521, e.g., in FIG. 4 of that application and in the accompanying text thereof.

In step 44, the object 12 is rotated to place the fiducial 14a in alignment with the motion reference frame. This is accomplished by rotating the object 12 (e.g., via motion stage 15) an amount sufficient to compensate for the difference between the orientation of the fiducial $i_\theta$ and the orientation of the motion reference frame τ. Those skilled in the art will, of course, appreciate that this amount can be increased or decreased to compensate for any known "delta" in the angle of the alignment feature of the fiducial 14a itself vis-à-vis the alignment reference 70. Moreover, it will be appreciated that alignment of the motion reference frame 62 and alignment reference frame 70 need not be exact but, rather, may vary by 0.5° to 10°, or more, depending on the requirements of the implementation.

The result of the rotation effected in step 44 is shown in FIG. 4C, where rotation of object 12 is shown to place the alignment reference frame 70 into alignment with the motion reference frame 62.

Steps 46–54 illustrates an alternate method of aligning the alignment and motion reference frames 70, 62, respectively. In step 46, the object 12 and optional motion stage 15 are moved as necessary to bring at least a selected fiducial, e.g., fiducial 14a, into the field of view of a selected image acquisition device 16a at a location referred to herein as the first fiducial position. Though the first fiducial position can lie anywhere in the field of view of device 16, in a preferred embodiment, it lies at the center of the field of view. As above, step 46 can be used to bring all fiducials 14a–14c into fields of view of their respective acquisition devices 16a–16c, though not necessarily simultaneously (depending on the relative spacing of the fiducials 14a–14c and the fields of view).

In step 48, the method determines the parameters of a line characterizing the selected fiducial 14a (and, more particularly, its image) vis-à-vis the image reference frame 64a. This is accomplished by identifying the linear feature in the fiducial's image and determining its characteristic equation (e.g., in the form ax+by=c or y=mx+b), all in the conventional manner known in the art. Those skilled in the art will, of course, appreciate that other equations (e.g., quadratics, etc.) capable of characterizing the linear feature may be used instead of the foregoing.

In step 50, the method repositions the object 12 by moving it along an axis, e.g., the x-axis, of the motion reference frame. As with step 36, above, distance moved is not critical, though, preferably object 12 is moved as much as possible while still keeping the selected fiducial 14a in the field of view of the selected acquisition device 16a.

In step 52, the method determines the parameters of a line characterizing the now-relocated fiducial 14a vis-à-vis the image reference frame 64a. This is accomplished in the same manner discussed above in connection with step 48.

In step 54, the method calls determines whether the linear feature of the fiducial 14a' is aligned with the selected axis of motion reference frame 62. That determination is based on the similarity of the line segments (the linear orientations and the average distance between points on one line segment and the closes point on the other line segment), or other such parameters, in the characterizing equations determined in steps 48 and 52. If those linear orientations are sufficiently similar (e.g., within 1 degree and, preferably, within 0.1 degrees, depending on the implementation), the average distance between points in the line segment and the closest points on the other line segment is sufficiently small (e.g., within 5 pixels and, preferably, within 0.5 pixels), then the linear feature is deemed to be aligned with the motion axis. If not, the object is rotated, e.g., less than 20° and, preferably, less than 10° (or otherwise, depending on the accuracy demand of the implementation) and steps 46–54 are re-executed.

Once the alignment reference frame 70 is in substantial alignment with the motion reference frame 62, e.g., via execution of steps 32–44 or 46–54, the method determines the calibration relationships between the imaging reference frames 64a–64c via execution of steps 56–64. Particularly, the illustrated embodiment executes steps 56–62 for each image acquisition device 16a–16c in order to determine (i) the known relative locations of the fiducials (vis-à-vis the alignment reference frame), (ii) the fiducial calibrating positions determined for each camera (vis-à-vis that camera's acquisition reference frame), and (iii) the object calibrating positions determined for each respective image acquisition device (vis-à-vis the motion reference frame). From that information, the method determines in step 64 the calibration relationships among the imaging reference frames 64a–64c.

In step 56, the illustrated method determines the calibration relationship between the imaging reference frame, e.g., 64a, of each acquisition device, e.g., 16a, and the motion reference frame 62. In a preferred embodiment, that relationship comprises the angular orientation (τ) of the imaging reference frame vis-à-vis the motion reference frame, the unit or pixel height (h) of the imaging reference frame vis- à-vis the motion reference frame, and the unit or pixel width (w) of the imaging reference frame vis-à-vis the motion reference frame. Though that calibration relationship can be determined in any manner known in the art, preferably, it is determined in accord with teachings of co-pending, commonly-assigned U.S. patent application Ser. No. 08/938,443, filed this same day herewith, entitled "MACHINE VISION METHODS USING FEEDBACK TO DETERMINE AN ORIENTATION, PIXEL WIDTH AND PIXEL HEIGHT OF A FIELD OF VIEW," the teachings of which are incorporated herein by reference.

In step 58, the method moves a fiducial, e.g., 14*a*, into the field of view of a respective image acquisition device, e.g., 16*a*. Thus, for example, in one pass of steps 56–62, fiducial 14*a* is brought into the field of view of image acquisition device 16*a*; in a second pass, fiducial 14*b* is brought into the field of view of image acquisition device 16*b*; and, in a third pass, fiducial 14*c* is brought into the field of view of image acquisition device 16*c*.

In step 60, the position of each fiducial, e.g., 14*a*, is recorded with respect to the imaging reference frame, e.g., 64*a*, of the respective image acquisition device, e.g., 16*a*. This is accomplished in the manner discussed above, e.g., in connection with step 34.

In step 62, the method determines the position of the object 12 vis-à-vis the motion reference frame 62 that results from the movement effected in step 32. That position can be determined by use of rulers, calipers, interferometry, telemetry, or other such techniques capable of identifying the position of the object 12 relative to a reference. In a preferred embodiment, in which the object 12 is disposed on a motion stage 15, the first object position is determined from the positional settings on the stage itself, e.g., from the indicators or read-outs on the stage's x-axis and y-axis motors (not shown).

As noted above, steps 56–62 are executed for each image acquisition device 16*a*–16*c*. In a preferred embodiment, those steps are executed, first, with respect to device 16*a*; then, with respect to device 16*b*; then, with respect to device 16*c*. Of course, this is not demanded by the invention, for which the steps can be executed "in parallel" or in any other such order.

In step 64, the method determines the calibration relationships among the imaging reference frames 64*a*–64*c* as a function of the information determined in steps 56–62 and, particularly, as a function of the relation:

$$\begin{vmatrix} O_{2x} - O_{1x} \\ O_{2y} - O_{1y} \end{vmatrix} = \begin{vmatrix} F_{2x} \\ F_{2y} \end{vmatrix} - \begin{vmatrix} F_{1x} \\ F_{1y} \end{vmatrix} -$$

$$\begin{vmatrix} w_2\cos(\tau_2) & -h_2\sin(\tau_2) \\ w_2\sin(\tau_2) & h_2\cos(\tau_2) \end{vmatrix} \begin{vmatrix} I_{2x} \\ I_{2y} \end{vmatrix} + \begin{vmatrix} w_1\cos(\tau_1) & -h_1\sin(\tau_1) \\ w_1\sin(\tau_1) & h_1\cos(\tau_1) \end{vmatrix} \begin{vmatrix} I_{1x} \\ I_{1y} \end{vmatrix}$$

where, $O_{ix}$, $O_{iy}$ is a location, in the motion reference frame, corresponding to an upper lefthand corner of a field of view of camera i;

$F_{ix}$, $F_{iy}$ represent the known relative locations of the fiducial i vis-à-vis the alignment reference frame.

$w_i$ is the unit height of the field of view of camera i vis-à-vis the motion reference frame;

$h_i$ is the unit height of the imaging reference frame of camera i vis-à-vis the motion reference frame;

$\tau$ is the orientation of the imaging reference frame of camera i vis-à-vis the motion reference frame; and $I_{ix}$, $I_{iy}$ represent the position of fiducial i with respect to the corresponding imaging reference frame.

Figure 5:
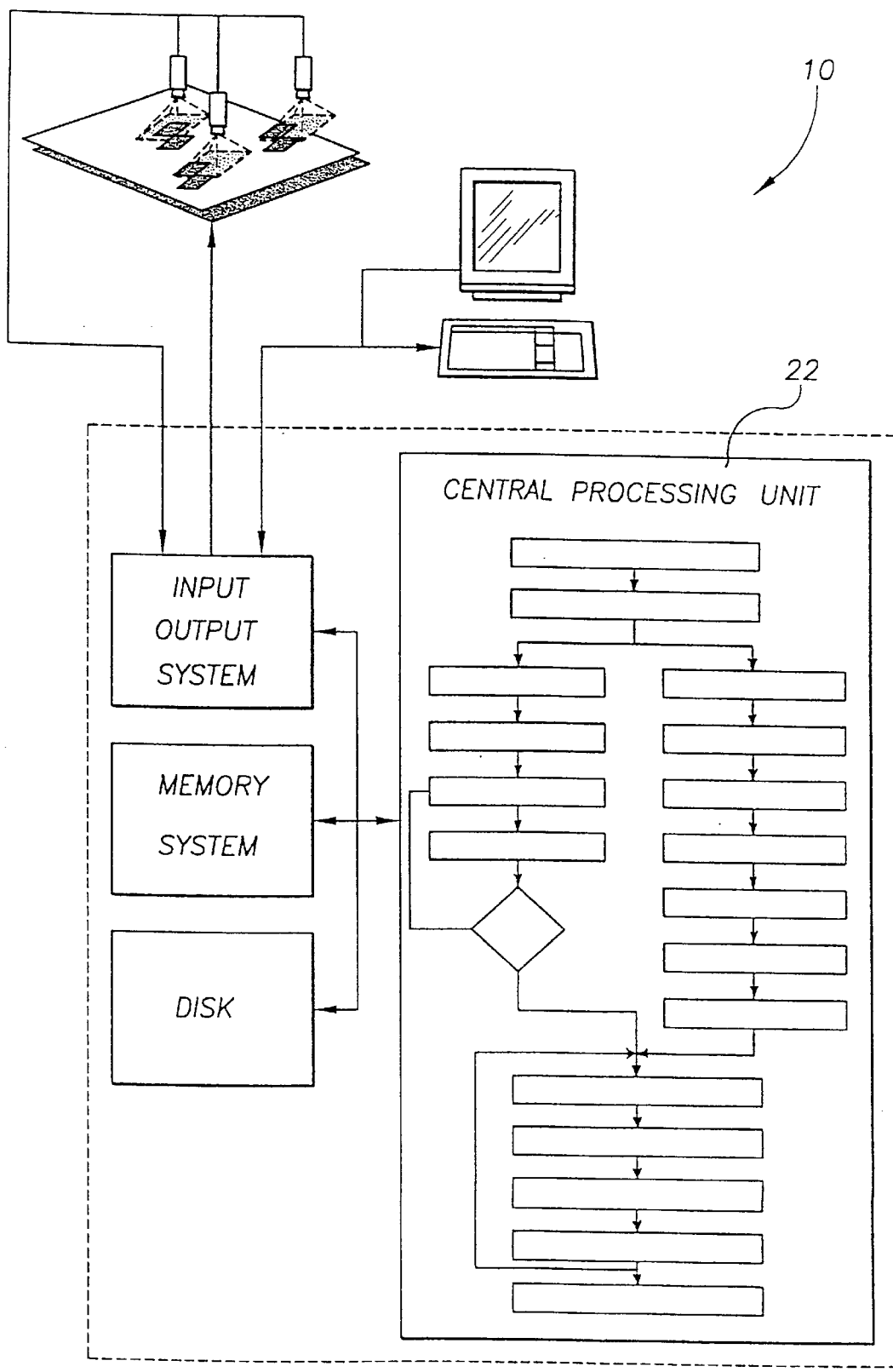
FIG. 5 depicts an apparatus configured for carrying out the method of FIG. 2.

FIG. 5 illustrates apparatus 10 configured for determining calibration relationships using the methodology discussed above. The device 10 is constructed and operated identically to that described above, e.g., in FIGS. 1 and 2. As particularly indicated by the flow-chart outline within the illustrated central processing unit 22, that element is configured using conventional computer programming techniques to execute steps 30–64, discussed above, and thereby to serve as means for providing that functionality.

By way of example, programming instructions corresponding to steps 30–54 configure the system 10 as an alignment element for aligning at least a selected axis of the alignment reference frame with at least a selected axis of the motion reference frame of the object; programming instructions corresponding to steps 56–62 configure the system 10 as a fiducial position-finding element for effecting the following operations of those steps with respect to each image acquisition device; and programming instructions corresponding to step 64 configure the system 10 as a relative position-determining element for determining a calibration relationship between the imaging reference frames of the respective image acquisition devices and for optionally passing the calibration information to other vision processing software tools or apparatus (not shown). It will, of course, be appreciated by way of example that the foregoing elements comprise not only the programmed central processing unit, but also the other components of the system, e.g., motion stage 15 and image acquisition device 16, necessary to acquire images of the object 12 and to effect motion thereof for purposes of repositioning the fiducial 14.

Figure 6:
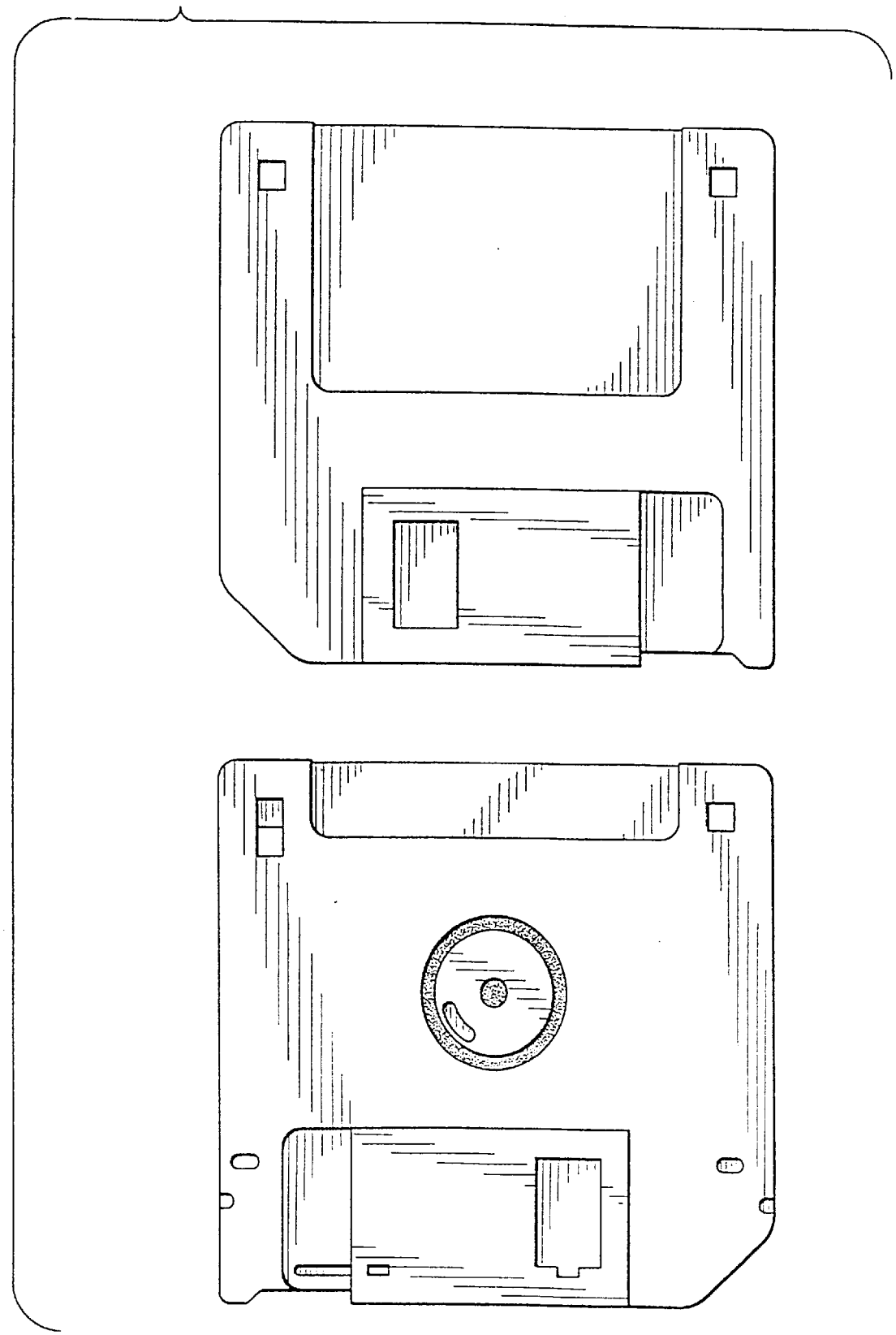
FIG. 6 depicts a computer readable medium containing programming instructions for configuring a general-purpose computer in practice the invention.

FIG. 6 depicts an article of manufacture, to wit, a magnetic diskette, composed of a computer usable media, to wit, a magnetic disk embodying a computer program that causes device 30, or other such digital data processing apparatus, to operate in accord with the methods described above in connection with FIGS. 1–5. The diskette is shown in front view and back view. It is of conventional construction and has the computer program stored on the magnetic media therein in a conventional manner readable, e.g., via a read/write head contained in a diskette drive of apparatus 30. It will be appreciated that diskette is shown by way of example only and that other articles of manufacture comprising computer usable media on which programs intended to cause a computer to execute in accord with the teachings hereof are also embraced by the invention.

Described above are apparatus and methods meeting the objects set forth herein. Those skilled in the art will appreciate that the specific embodiments illustrated in the drawings and described above are illustrative only, and that other embodiments incorporating modifications thereto fall within the scope of the invention. Thus, for example, it will be appreciated that the invention does not require that there exist a one-to-one relationship between fiducials 14*a*–14*c* and image acquisition devices 16*a*–16*c*. It is preferred, however, that there be at least two fiducials, e.g., 14*a*–14*b*, so that there know relative positions in the alignment reference frame can be exploited to facilitate determination of the calibration relationships between the imaging reference frames 64*a*–64*c*. Still further, for example, it will be appreciated the foregoing teachings can be applied, not only to calibrating the imaging reference frames of multiple cameras that image a common object, but also to multiple cameras that image different objects on a common motion stage or conveyor belt. Yet still further, it will be appreciated that positions in the reference frames need not necessarily be represented by (x, y) coordinate pairs but, rather, can be represented by (r, θ) pairs or other such positional indicators.

In view of the foregoing, what we claim is:

1. A machine vision method of determining a calibration relationship between imaging reference frames of multiple respective image acquisition devices that acquire images of a common object, wherein the object has thereon at least two fiducials, each being at a known location relative to the other with respect to an alignment reference frame associated with at least a selected one of the fiducials, the method comprising the steps of:

A. aligning at least a selected axis of the alignment reference frame with at least a selected axis of the motion reference frame of the object;
   B. for each image acquisition device,
      i. placing a respective one of the fiducials in a field of view of that device;
      ii. determining a position of that fiducial with respect to the imaging reference frame of that device, that position being referred to as a "fiducial calibrating position";
      iii. determining a position of the object with respect to the motion reference frame, that position hereinafter referred to as an "object calibrating position"; and
   C. determining a calibration relationship between the imaging reference frames of the respective image acquisition devices as a function of the known relative locations of the fiducials with respect to the alignment reference frame, as a function of fiducial calibrating position determined for each image acquisition device, and as a function of the object calibrating position of each respective image acquisition device.

2. A method according to claim 1, wherein step (A) comprises the steps of
   i. placing the selected fiducial in a field of view of a selected image acquisition device;
   ii. determining a location of the selected fiducial with respect to an imaging reference frame of the selected image acquisition device, that location being referred to as a "first fiducial position";
   iii. moving the object along an axis of the motion reference frame and placing it in the field of view of the selected image acquisition device;
   iv. determining a location of the selected fiducial with respect to the imaging reference frame of the selected image acquisition device, that location being referred to as a "second fiducial position";
   v. determining an orientation of the motion reference frame with respect to the imaging reference frame of the selected image acquisition device as a function of the first and second fiducial positions; and
   vi. rotating the object to substantially align the selected fiducial with the motion reference frame with respect to the imaging reference frame of the selected image acquisition device.

3. A method according to claim 2, wherein step (v) comprises determining the orientation of a line defined by the first and second fiducial positions.

4. A method according to claim 3, wherein step (v) comprises determining an orientation τ of the motion reference frame by as a function of the relation:

$$\tau = -a\tan 2(i_{y1} - i_{y0}, i_{x1} - i_{x0})$$

where,
   $(i_{x0}, i_{y0})$ are imaging reference frame coordinates of the first image position;
   $(i_{x1}, i_{y1})$ are imaging reference frame coordinates of the second image position;
   a tan 2() is an arctangent function.

5. A method according to claim 3, wherein step (vi) comprises rotating the object to bring the selected fiducial in substantial alignment with the line defined by the first and second fiducial positions.

6. A method according to claim 3, wherein the selected fiducial has an alignment feature and wherein step (vi) comprises rotating the object to bring the alignment feature in substantial alignment with the line defined by the first and second fiducial positions.

7. A method according to claim 6, wherein the alignment feature is substantially aligned with the selected axis of the alignment reference frame.

8. A method according to claim 1, wherein at least the selected fiducial has a linear feature in substantial alignment with the selected axis of the alignment reference frame and wherein step (A) comprises the steps of
   (A)(i) placing the selected fiducial in a field of view of a selected image acquisition device;
   (A)(ii) determining parameters of a line characterizing the linear feature with respect to the imaging reference frame of the selected image acquisition device, those parameters being to as "first linear parameters";
   (A)(iii) moving the object along an axis of the motion reference frame;
   (A)(iv) determining parameters of a line characterizing the linear feature with respect to the imaging reference frame of the selected image acquisition device, those parameters being to as "second linear parameters";
   (A)(v) comparing the first and second linear parameters to determine whether the linear feature is in substantial alignment with the selected axis of the motion reference frame.

9. A method according to claim 8, wherein step (A)(v) comprises responding to a determination that the first and second linear parameters describe lines that do not have a identical axial intercept for rotating the object and repeating the steps (A)(i)–(A)(v).

10. A method according to claim 1, wherein step (C) comprises determining a calibration relationship between the imaging reference frames of the respective image acquisition devices in accord with the relation:

$$\begin{vmatrix} O_{2x} - O_{1x} \\ O_{2y} - O_{1y} \end{vmatrix} = \begin{vmatrix} F_{2x} \\ F_{2y} \end{vmatrix} - \begin{vmatrix} F_{1x} \\ F_{1y} \end{vmatrix} -$$

$$\begin{vmatrix} w_2\cos(\tau_2) & -h_2\sin(\tau_2) \\ w_2\sin(\tau_2) & h_2\cos(\tau_2) \end{vmatrix} \begin{vmatrix} I_{2x} \\ I_{2y} \end{vmatrix} + \begin{vmatrix} w_1\cos(\tau_1) & -h_1\sin(\tau_1) \\ w_1\sin(\tau_1) & h_1\cos(\tau_1) \end{vmatrix} \begin{vmatrix} I_{1x} \\ I_{1y} \end{vmatrix}$$

where,
   $O_{ix}, O_{iy}$ is a location, in the motion reference frame, corresponding to an upper lefthand corner of a field of view of camera i;
   $F_{ix}, F_{iy}$ represent the known relative locations of a fiducial i vis-à-vis the alignment reference frame;
   $w_i$ is the unit height of the field of view of camera i vis-à-vis the motion reference frame;

h_i is the unit height of the imaging reference frame of camera i vis-à-vis the motion reference frame;

τ is the orientation of the imaging reference frame of camera i vis-à-vis the motion reference frame; and $I_{ix}$, $I_{iy}$ represent a position of fiducial i with respect to the corresponding imaging reference frame.

11. A machine vision apparatus for determining a calibration relationship between imaging reference frames of multiple respective image acquisition devices that acquire images of a common object, wherein the object has thereon at least two fiducials, each being at a known location relative to the other with respect to an alignment reference frame associated with at least a selected one of the fiducials, the apparatus comprising:

A. alignment means for aligning at least a selected axis of the alignment reference frame with at least a selected axis of the motion reference frame of the object;

B. fiducial position-finding means for effecting the following operations with respect to each image acquisition device:
 i. placing a respective one of the fiducials in a field of view of that device;
 ii. determining a position of that fiducial with respect to the imaging reference frame of that device, that position being referred to as a "fiducial calibrating position";
 iii. determining a position of the object with respect to the motion reference frame, that position being referred to as an "object calibrating position"; and C. relative position-determining means for determining a calibration relationship between the imaging reference frames of the respective image acquisition devices as a function of the known relative locations of the fiducials with respect to the alignment reference frame, as a function of fiducial calibrating position determined for each image acquisition device, and as a function of the object calibrating position determined for each respective image acquisition device.

12. An apparatus according to claim 11, wherein the alignment means effects the following operations:
 i. placing the selected fiducial in a field of view of a selected image acquisition device;
 ii. determining a location of the selected fiducial with respect to an imaging reference frame of the selected image acquisition device, that location being referred to as a "first fiducial position";
 iii. moving the object along an axis of the motion reference frame and placing it in the field of view of the selected image acquisition device;
 iv. determining a location of the selected fiducial with respect to the imaging reference frame of the selected image acquisition device, that location being referred to as a "second fiducial position";
 v. determining an orientation of the motion reference frame with respect to the imaging reference frame of the selected image acquisition device; and
 vi. rotating the object to substantially align the selected fiducial with the motion reference frame with respect to the imaging reference frame of the selected image acquisition device.

13. An apparatus according to claim 12, wherein the alignment means determines the orientation of a line defined by the first and second fiducial positions.

14. An apparatus according to claim 13, wherein the alignment means determines an orientation τ of the motion reference frame by as a function of the relation:

$$\tau = -a\tan 2(i_{y1}-i_{y0}, i_{x1}-i_{x0})$$

where, ($i_{x0}$, $i_{y0}$) are imaging reference frame coordinates of the first image position;

($i_{x1}$, $i_{y1}$) are imaging reference frame coordinates of the second image position;

a tan 2() is an arctangent function.

15. An apparatus according to claim 13, wherein the alignment means rotates the object to bring the selected fiducial in substantial alignment with the line defined by the first and second fiducial positions.

16. An apparatus according to claim 13, wherein the selected fiducial has an alignment feature and wherein the alignment means rotates the object to bring the alignment feature in substantial alignment with the line defined by the first and second fiducial positions.

17. An apparatus according to claim 16, wherein the alignment feature is substantially aligned with the alignment reference frame.

18. An apparatus according to claim 11, wherein at least the selected fiducial has a linear feature in substantial alignment with the selected axis of the alignment reference frame and wherein step (A) comprises the steps of (A)(i) placing the selected fiducial in a field of view of a selected image acquisition device;

(A)(ii) determining parameters of a line characterizing the linear feature with respect to the imaging reference frame of the selected image acquisition device, those parameters being to as "first linear parameters";

(A)(iii) moving the object along an axis of the motion reference frame;

(A)(iv) determining parameters of a line characterizing the linear feature with respect to the imaging reference frame of the selected image acquisition device, those parameters being to as "second linear parameters";

(A)(v) comparing the first and second linear parameters to determine whether the linear feature is in substantial alignment with the selected axis of the motion reference frame.

19. An apparatus according to claim 18, wherein the alignment means responds to a determination that the first and second linear parameters describe lines that do not have a identical axial intercept for rotating the object and repeating the steps (A)(i)–(A)(v).

20. An apparatus according to claim 11, wherein the relative position-determining means comprises determining a calibration relationship between the imaging reference frames of the respective image acquisition devices in accord with the relation:

$$\begin{vmatrix} O_{2x} - O_{1x} \\ O_{2y} - O_{1y} \end{vmatrix} = \begin{vmatrix} F_{2x} \\ F_{2y} \end{vmatrix} - \begin{vmatrix} F_{1x} \\ F_{1y} \end{vmatrix} -$$

$$\begin{vmatrix} w_2\cos(\tau_2) & -h_2\sin(\tau_2) \\ w_2\sin(\tau_2) & h_2\cos(\tau_2) \end{vmatrix} \begin{vmatrix} I_{2x} \\ I_{2y} \end{vmatrix} + \begin{vmatrix} w_1\cos(\tau_1) & -h_1\sin(\tau_1) \\ w_1\sin(\tau_1) & h_1\cos(\tau_1) \end{vmatrix} \begin{vmatrix} I_{1x} \\ I_{1y} \end{vmatrix}$$

where, $O_{ix}$, $O_{iy}$ is a location, in the motion reference frame, corresponding to an upper lefthand corner of a field of view of camera i;

$F_{ix}$, $F_{iy}$ represent the known relative locations of a fiducial i vis-à-vis the alignment reference frame;

$w_i$ is the unit height of the field of view of camera i vis-à-vis the motion reference frame;

$h_i$ is the unit height of the imaging reference frame of camera i vis-à-vis the motion reference frame;

$\tau$ is the orientation of the imaging reference frame of camera i vis-à-vis the motion reference frame; and $I_{ix}$, $I_{iy}$ represent a position of fiducial i with respect to the corresponding imaging reference frame.

21. An article of manufacture comprising a computer usable medium embodying program code for causing a digital data processor to carry out a method of determining a calibration relationship between imaging reference frames of multiple respective image acquisition devices that acquire images of a common object, wherein the object has thereon at least two fiducials, each being at a known location relative to the other with respect to an alignment reference frame associated with at least a selected one of the fiducials, the method comprising the steps of:

A. aligning at least a selected axis of the alignment reference frame with at least a selected axis of the motion reference frame of the object;

B. for each image acquisition device,
    i. placing a respective one of the fiducials in a field of view of that device;
    ii. determining a position of that fiducial with respect to the imaging reference frame of that device, that position being referred to as a "fiducial calibrating position";
    iii. determining a position of the object with respect to the motion reference frame, hereinafter referred to as an "object calibrating position"; and C. determining a calibration relationship between the imaging reference frames of the respective image acquisition devices as a function of the known relative locations of the fiducials with respect to the alignment reference frame, as a function of fiducial calibrating position determined for each image acquisition device, and as a function of the object calibrating position determined for each respective image acquisition device.

22. An article of manufacture according to claim 21, wherein step (A) comprises the steps of i. placing the selected fiducial in a field of view of a selected image acquisition device;
  ii. determining a location of the selected fiducial with respect to an imaging reference frame of the selected image acquisition device, that location being referred to as a "first fiducial position";
  iii. moving the object along an axis of the motion reference frame and placing it in the field of view of the selected image acquisition device;
  iv. determining a location of the selected fiducial with respect to the imaging reference frame of the selected image acquisition device, that location being referred to as a "second fiducial position";
  v. determining an orientation of the motion reference frame with respect to the imaging reference frame of the selected image acquisition device; and
  vi. rotating the object to substantially align the selected fiducial with the motion reference frame with respect to the imaging reference frame of the selected image acquisition device.

23. An article of manufacture according to claim 22, wherein step (v) comprises determining the orientation of a line defined by the first and second fiducial positions.

24. An article of manufacture according to claim 23, wherein step (v) comprises determining an orientation $\tau$ of the motion reference frame by as a function of the relation:

$$\tau = -a\tan 2(i_{y1} - i_{y0}, i_{x1} - i_{x0})$$

where, $(i_{x0}, i_{y0})$ are imaging reference frame coordinates of the first image position;

$(i_{x1}, i_{y1})$ are imaging reference frame coordinates of the second image position;

a tan 2() is an arctangent function.

25. An article of manufacture according to claim 23, wherein step (vi) comprises rotating the object to bring the selected fiducial in substantial alignment with the line defined by the first and second fiducial positions.

26. An article of manufacture according to claim 23, wherein the selected fiducial has an alignment feature and wherein step (vi) comprises rotating the object to bring the alignment feature in substantial alignment with the line defined by the first and second fiducial positions.

27. An article of manufacture according to claim 26, wherein the alignment feature is substantially aligned with the selected axis of the alignment reference frame.

28. An article of manufacture according to claim 21, wherein at least the selected fiducial has a linear feature in substantial alignment with the selected axis of the alignment reference frame and wherein step (A) comprises the steps of (A)(i) placing the selected fiducial in a field of view of a selected image acquisition device;

(A)(ii) determining parameters of a line characterizing the linear feature with respect to the imaging reference frame of the selected image acquisition device, those parameters being to as "first linear parameters";

(A)(iii) moving the object along an axis of the motion reference frame;

(A)(iv) determining parameters of a line characterizing the linear feature with respect to the imaging reference frame of the selected image acquisition device, those parameters being to as "second linear parameters";

(A)(v) comparing the first and second linear parameters to determine whether the linear feature is in substantial alignment with the selected axis of the motion reference frame.

29. An article of manufacture according to claim 28, wherein step (v) comprises responding to a determination that the first and second linear parameters describe lines that do not have a identical axial intercept for rotating the object and repeating the steps (A)(i)–(A)(v).

* * * * *